June 16, 1964 J. BRUECKER 3,137,067
METHOD OF AND APPARATUS FOR FORMING PERFORATED SHEAR
PLATES FOR DRY SHAVERS OF THE ROTARY TYPE
Filed June 29, 1960 3 Sheets-Sheet 1
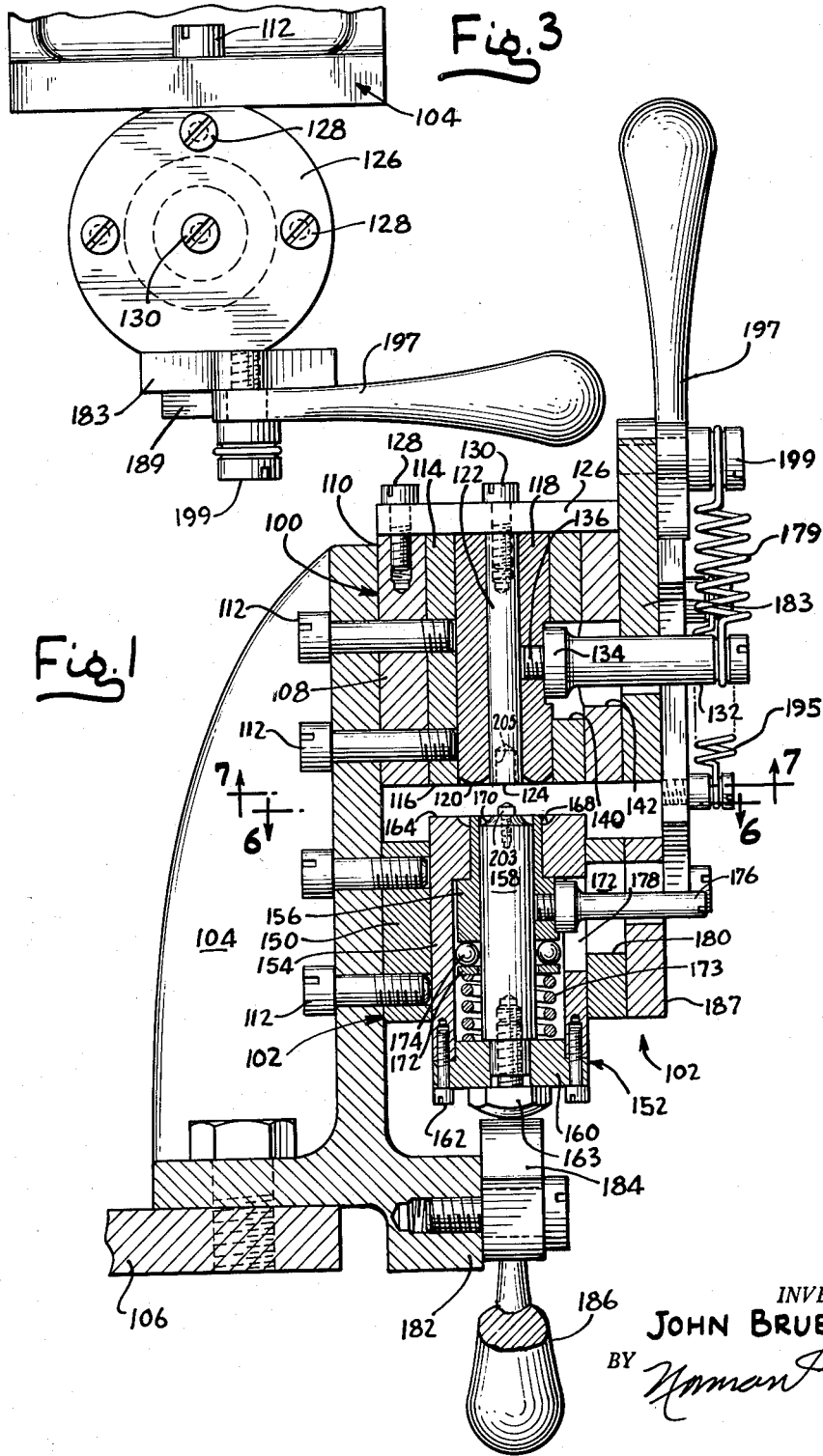
INVENTOR.
JOHN BRUECKER

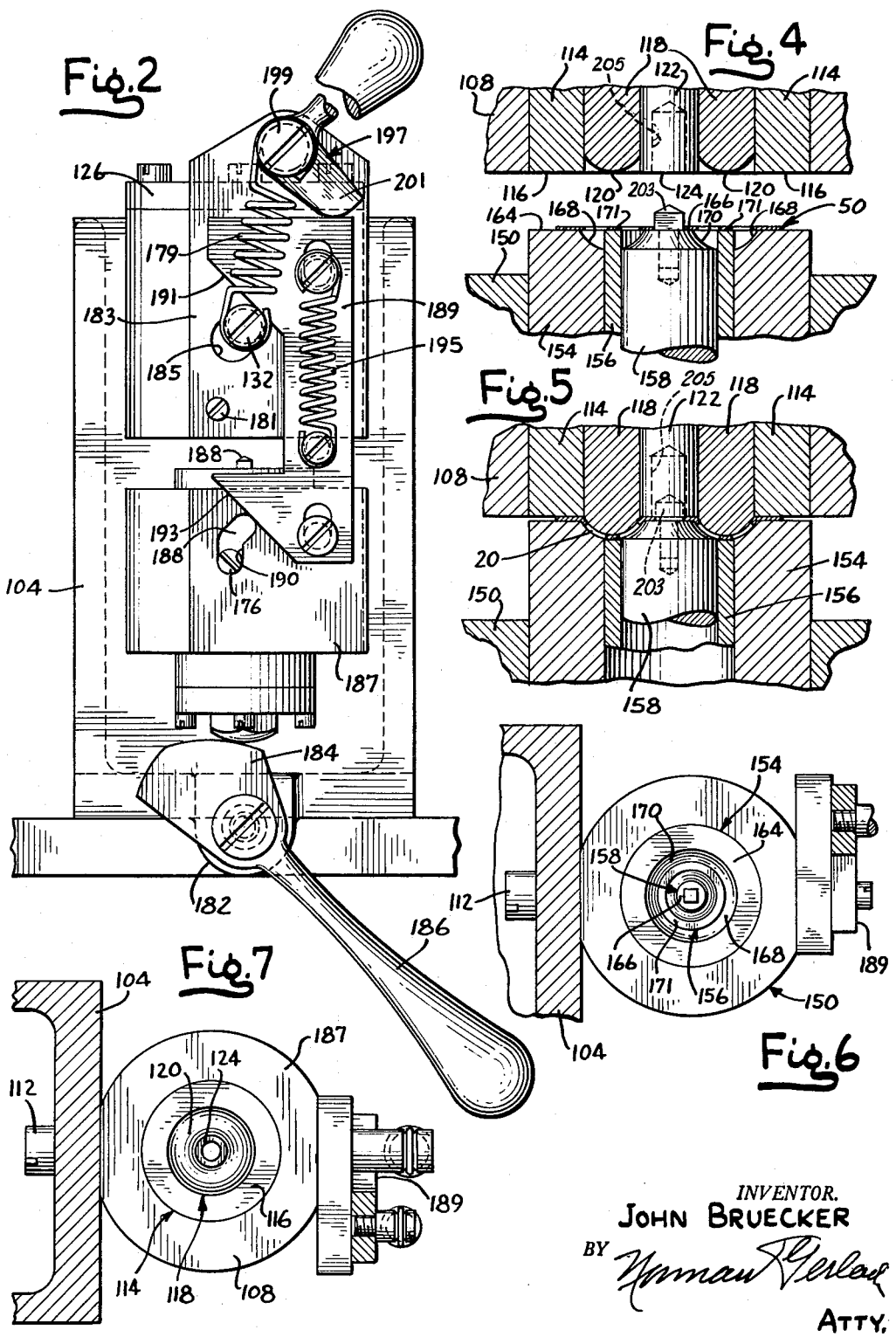

June 16, 1964   J. BRUECKER   3,137,067
METHOD OF AND APPARATUS FOR FORMING PERFORATED SHEAR
PLATES FOR DRY SHAVERS OF THE ROTARY TYPE
Filed June 29, 1960   3 Sheets-Sheet 3
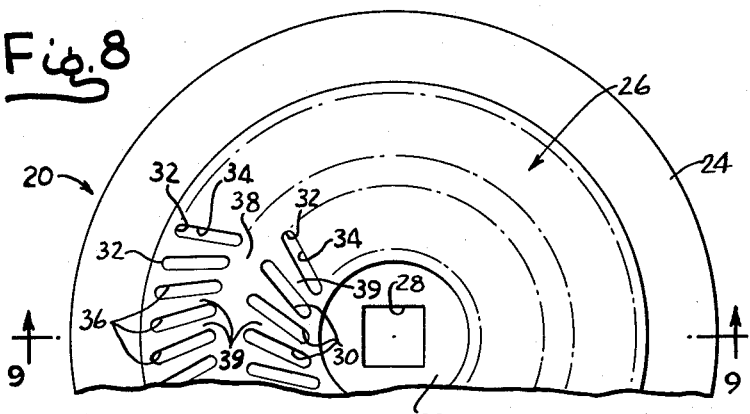
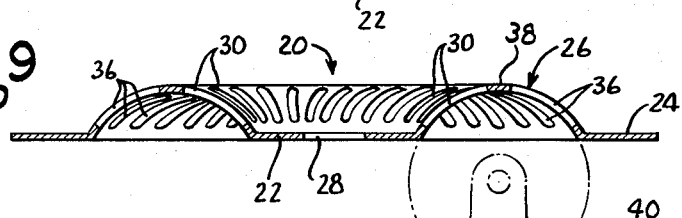
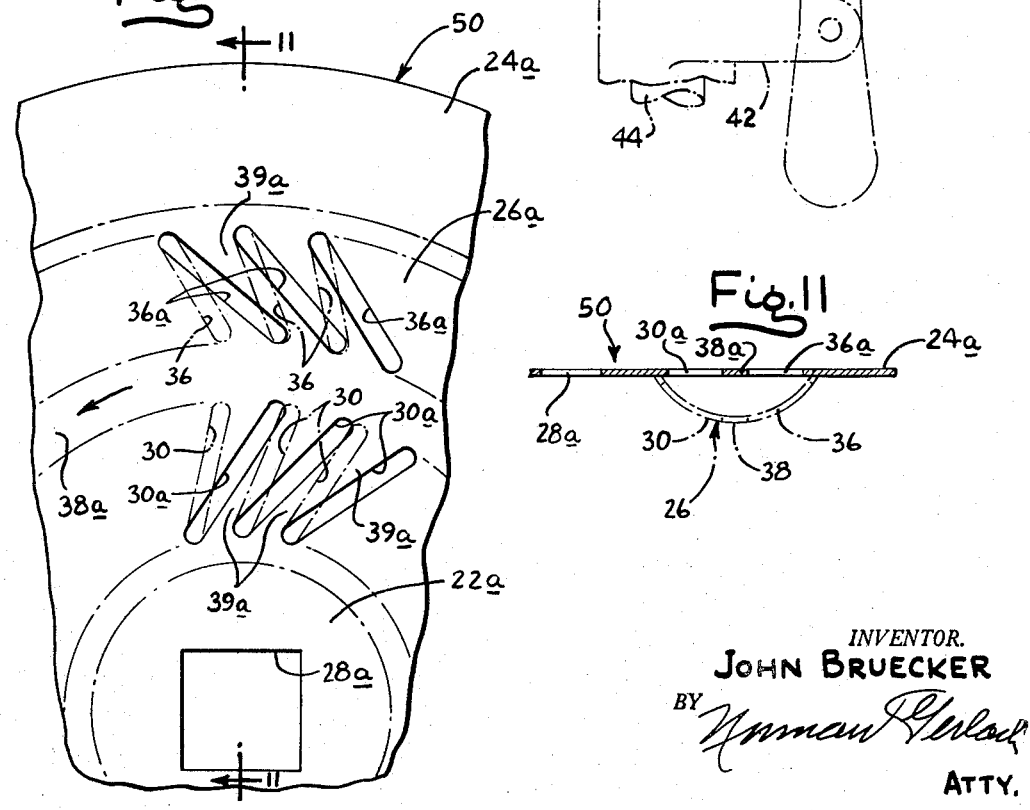
INVENTOR.
JOHN BRUECKER
BY Norman Gerlach
ATTY.

United States Patent Office 3,137,067
Patented June 16, 1964

3,137,067
METHOD OF AND APPARATUS FOR FORMING PERFORATED SHEAR PLATES FOR DRY SHAVERS OF THE ROTARY TYPE
John Bruecker, Glendale, Calif.
(Johann-Bruecker-Strasse 5, Wurttemberg, Germany)
Filed June 29, 1960, Ser. No. 39,592
6 Claims. (Cl. 29—549)

The present invention relates to a method of and an apparatus for forming perforated shear plates for mechanical razors, commonly referred to as dry shavers. The invention is specifically concerned with the manufacture of circular shear plates for dry shavers of the rotary type wherein the cutter sweeps in circumferential fashion around the inside face of a conformably shaped perforated shear plate.

In my United States Patent No. 3,019,525, granted on February 6, 1962, and entitled "Shear Plate and Cutter Assembly for Rotary Type Dry Shavers," there has been disclosed a shear plate which is generally of circular design and which is formed with an offset in the form of a continuous concavo-convex lateral torus which extends around the peripheral regions of the plate and within which torus there is adapted to sweep in rotary fashion the arcuate cutting edge of a cooperating cutter element. The inside region of the torus, i.e. the region which faces inwardly toward the center of the circular shear plate, is formed with a series of circumferentially spaced hair-receiving slots, the edges of which cooperate with the cutting edge of the cutter for shearing purposes. Similarly, the outside regions of the torus, i.e. the region which faces outwardly away from the center of the shear plate, is formed with a similar series of hair-receiving slots. The inside and outside slots are arranged in proximate pairs, the axes of each pair of slots extending at an obtuse angle to each other in V-fashion with the intersection of the slots taking place along the crest of the torus. Stated in other words, the paired slots on opposite sides of the torus are complemental. It is to the formation of a shear plate of this specific character that the method and apparatus of the present invention specifically relates.

The difficulties involved in attempting to make a shear plate from thin flat metal stock by providing therein a perforated lateral torus are manifold. The creation of a continuous lateral torus in flat sheet metal stock naturally suggests the use of cooperating male and female torus dies and the performance thereby of a deep drawing operation. Where the torus is not to be perforated, and where articles other than shear plates are concerned, a satisfactory torus may be formed by performing such a deep drawing operation. However, in a shear plate for dry shavers where the torus is to be perforated by the provision of slots therein as described above, it is impractical to punch the slots in the shear plate after the torus has been formed, and, if the slots are initially created in the flat metal blank, the metal drawing operation will not only thin the metal surrounding the slots to an undue extent, but it will, in the case of the paired slots, produce intervening ribbons of metal between adjacent slots on either side of the torus which are thinner in their medial regions than at their ends. Furthermore, the unequal distribution of metal involved will create high and low spots relative to the circular cutter edge so that the contour of the cutter edge will not match the contour of the torus in which it rides.

The present invention is designed to overcome the above noted limitations that are attendant upon the creation of a perforated torus in flat sheet metal stock and, toward this end it contemplates the provision of a novel method of shaping a flat circular pre-punched sheet metal blank so as to produce therein the torus, slotted as hereinbefore described, without deep drawing or stretching the metal of the blank in any way whatsoever, and so that, in the finished blank, all portions thereof, including the torus, are of uniform thickness, i.e. the thickness of the original unformed blank. The invention further contemplates the provision of a novel set of forming dies whereby such method may efficiently be carried out.

Briefly, in carrying out the method of the present invention, a flat circular sheet metal disk or blank, preferably of stainless steel, is pre-punched to create therein an annular series of circumferentially spaced slots. The slots extend around the peripheral regions of the circular blank and they are arranged in proximate pairs and in two concentric circular rows. The two concentric rows of spaced slots are separated by a narrow band or annulus. The slots of each row are dispsed in parallelism and adjacent slots are in close proximity to each other so that each slot is separated from the adjacent slot in either side thereof in the row by a thin ribbon of the stock material. The paired slots in the two concentric rows respectively have their axes extending at an acute angle so that the adjacent ribbons of the stock material in the vicinity of the two rows of slots form a series of chevron-like V-formation around the annulus.

The thus punched flat circular blank is then placed in operative position in a set of die instrumentalities of special design and constructed in accordance with the principles of the present invention and the annulus which contains the two circular rows of slots is operated upon to produce the slotted torus by a metal-displacing operation without significant metal-drawing, metal-stretching, or similar molecular displacement within the body of the blank. Specifically, the die instrumentalities include upper and lower die assemblies between which the blank is placed in the usual manner of deep drawing operations. Each assembly is comprised of three concentric die elements, the upper assembly including a fixed inner clamping die, a fixed outer clamping die spaced outwardly from the inner clamping die, and a movable intermediate clamping and shaping die which substantially fills the annular space existing between the inner and outer clamping dies. The lower assembly includes a fixed inner clamping and shaping die, a fixed outer clamping and shaping die, and a movable intermediate clamping die. The two intermediate dies are in the form of sleeves which are capable of limited turning movement within the annular spaces existing between the adjacent inner and outer dies and which also are capable of limited vertical or axial movement within these spaces.

When the two assemblies are brought into clamping cooperation with the interposed blank, the two fixed central or inner dies firmly clamp the central or hub region of the blank therebetween, while the two fixed outer dies firmly clamp the outer marginal region of the blank therebetween. The intervening annular region of the blank, containing the slots and the chevron-like ribbon formation previously described, spans the distance between the fixed inner and the fixed outer clamping dies. The lower end of the upper intermediate die is shaped conformably to the concave side of the torus which is to be formed in the blank. The thickness of this intermediate die is thus substantially equal to the full radial width of the torus. The thickness of the lower intermediate die is equal only to the radial width of the narrow imperforate annulus which exists between the two rows of preformed slots in the blank. The upper intermediate die is in vertical register with all three lower dies and the upper ends of these three dies, considered as a unit, are shaped conformably to the convex side of the torus to be formed in the blank. At the time that the blank is clamped in position between the opposed ends of the fixed dies, the intermediate clamping dies are brought into clamping position above and below the imperforate annulus which exists between the two rows of slots and, thereafter, the two intermediate dies are caused to move in unison in such a manner as to impart a twisting or circumferential shifting motion to the imperforate annulus whereby it is rotated a few degrees in one direction bodily as a whole and relatively to both the firmly clamped fixed central stationary region of the blank and the firmly clamped fixed marginal region of the blank. At the same time that the circumferential shift is applied to the imperforate annulus, the two movable dies are caused to descend, thus pulling the annulus downwardly out of the plane of the blank. The net result of this operation upon the annulus is to swing the chevron-like ribbons of metal stock downwardly out of the plane of the blank and cause them to assume new positions at a predetermined angle to their original positions in the planar blank. At the same time that these ribbons are swung downwardly, the cooperating portions of the upper and lower forming dies, i.e. the central movable upper die and the inner and outer fixed lower dies, operate upon these ribbons to impart to them a curvature conformable to the cross sectional curvature of the torus being formed.

As will be pointed out in greater detail presently, the angle of inclination between the slots of each pair of slots, and the transverse arcuate extent of the torus, are the two factors which control the final inclination of the slots in the formed torus. When the angle between the slots in the blank does not exceed a predetermined minimum angle which is established on the basis of these two factors, the displacement of the chevron-like ribbons of material between the slots, and which cooperate to make up a major portion of the torus in the finished shear plate, is effected with practically no stretching or other deformation of the metal of the blank. The preservation of such a relationship of angles constitutes one of the principal features of the present invention.

The provision of a method of forming a perforated torus in a flat prepunched circular blank to produce a shear plate as briefly described above, and the provision of an apparatus by means of which the method may effectively be carried out, being among the principal objects of the invention, numerous other objects and advantages, not at this time enumerated will become more readily apparent as the following description ensues.

In the accompanying three sheets of drawings forming a part of this specification, one form of apparatus by means of which the present method may be carried out has been illustrated.

In these drawings:

FIG. 1 is a sectional view taken substantially centrally and vertically through a set of die instrumentalities constructed in accordance with the principles of the present invention;

FIG. 2 is a front elevational view of the structure shown in FIG. 1;

FIG. 3 is a top plan view of the structure shown in FIG. 1;

FIG. 4 is an enlarged fragmentary sectional view taken substantially centrally and vertically through the die instrumentalities of FIG. 1 in the immediate vicinity of the forming region and showing a blank in position for subsequent forming;

FIG. 5 is a sectional view similar to FIG. 4 showing the dies in their actual forming position;

FIG. 6 is an enlarged sectional view taken substantially along the line 6—6 of FIG. 1;

FIG. 7 is an enlarged sectional view taken substantially along the line 7—7 of FIG. 1;

FIG. 8 is an enlarged fragmentary plan view of a shear plate constructed according to the method of the present invention;

FIG. 9 is a sectional view taken substantially along the line 9—9 of FIG. 8;

FIG. 10 is an enlarged detail fragmentary plan view, somewhat schematic in its representation, of a portion of a shear plate blank and illustrating the manner in which certain metal-displacing operations are performed upon the blank to produce the finished shear plate; and FIG. 11 is a sectional view taken substantially along the line 11—11 of FIG. 10.

Referring now to the drawings, and in particular to FIGS. 8 and 9, there has been disclosed in these views a shear plate 20 for a dry shaver of the type shown and described in my copending application above referred to. It is specifically a shear plate of this character which the present method and apparatus is designed to produce.

The details of the shaver head other than the shear plate 20 are unimportant insofar as the present invention is concerned and reference may be had to such copending application for a disclosure and detailed description of such a shaver head. It is deemed sufficient for purposes of disclosure herein to describe the nature of the shear plate and the manner in which it cooperates with the cutting edge of one or more associated cutters.

The shear plate 20 is generally of circular design, it being in the form of a flat cirlcular disk having a central circular hub portion 22 and a narrow annular peripheral rim portion 24, the two portions being flat and coplanar. Extending between the hub portion 22 and rim portion 24 is a raised, upwardly offset rib 26 which is arcuate in radial cross section and circular in plan. This raised offset rib is in the form of a lateral concavo-convex torus which extends completely around the disk throughout the full 360° extent thereof and which, in transverse cross section is approximately of 90° arcuate extent. The hub portion 22 is provided with a central pilot hole 28 which may be square in configuration and the function of which will become clear presently. On the inner side of the torus 26, i.e. the side thereof facing the hub portion 22, there are provided a series of circular row of equally and circumferentially spaced elongated hair-receiving slots 30 having rounded ends 32 and straight parallel sides 34. On the outer side of the torus 26, i.e. the side facing the peripheral rim portion 24, a similar series or circular row of spaced elongated slots 36 are provided. The slots 30 and 36 are equal in number and are arranged in adjacent pairs, the axes of the slots 30 of each pair, when viewed as a stereographic projection, extending at a relatively wide obtuse angle as shown in dotted lines in FIG. 11 and by virtue of phenomena involved in the method of forming the shear plate as will be described presently.

The two rows of slots 30 and 36 are spaced apart radially of the circular plate, thus defining therebetween a narrow circular region or band 38 at the crest of the torus 26. This narrow circular region 38 is shown herein as being imperforate but, if desired, a series of small hair-receiving holes may be provided in the same to augment the shearing action of the slots 30 and 36 in cooperation with the cutting edge of one or more rotary cutter elements. It is to be noted at this point that in each row of slots the adjacent slots define between them a narrow ribbon 39 of the stock material. These ribbons 39 in the two rows are inclined relative to each other at a relatively wide obtuse angle.

A cutter has been shown at 40 in dotted lines in FIG. 9 merely for the purpose of illustrating the manner of use of the shear plate 20 and establishing a reason for the provision of the torus 26 in the otherwise flat shear plate. For a full understanding of the nature of the cutter 40, reference may be had to my above-mentioned copending application. It is deemed sufficient for purposes of discussion herein to state that the cutter is of a circular nature, is mounted floatingly on the end of a radial drive arm 42 which, in turn, is mounted on a central drive shaft 44, has an arcuate cutting edge which registers with the inner or concave side of the torus 26, and is caused to sweep in circular fashion around the torus for shearing cooperation with the various slots 30 and 36 provided in the torus.

According to the present method, the shear plate 20 described above is formed from a flat circular blank of sheet metal stock, preferably thin stainless steel. The blank is initially prepunched to provide a series of slots therein and a quarter-section of the prepunched blank has been illustrated in FIG. 10 and designated in its entirety at 50. The slots which are formed in the blank 50 are arranged in two concentric circular rows including an inner row of slots 30a and an outer row of slots 36a. The slots 30a and 36a are arranged in a pattern which, when the blank 50 is shaped to produce the completed shear plate 20, will result in the arrangement of slots 30 and 36 as previously described and the stereographic projection of which has been indicated in dotted lines in FIG. 10. Accordingly, the slots 30a and 36a are disposed in adjacent pairs with the axes of the slots of each pair extending at an angle to each other.

If it is specified that the adjacent paired slots in the completely formed torus be inclined with respect to each other at a definite angle, then the angle at which the paired slots extend in the blank is critical for any given torus radius. The geometrical relationship between slot inclination and torus radius will be set forth subsequently after a description of the manner in which the blank is operated upon to produce the finished shear plate has been set forth.

Still referring to FIG. 10 the area of the blank which corresponds to the outer peripheral rim portion 24 of the shear plate 20 has been designated at 24a, the torus portion at 26a, the hub portion at 22a, the pilot hole at 28a, and the narrow imperforated medial annulus or band between the two rows of slots at 38a. According to the present method, as seen in FIGS. 9 and 10, to create the torus 26 in the flat blank 50 and thus produce the finished shear plate 20, the imperforate band 38a is shifted circumferentially a few degrees with respect to the imperforate peripheral rim portion 24a and to the central hub portion 22a as indicated by the directional arrow. In FIG. 10, while at the same time the band is lowered bodily and thus displaced downwardly a distance equal to the depth of the torus so that the band assumes a position coincident with the crest of the torus in the finished shear plate.

Such circumferential shifting and axial displacement of the band 38a results in a displacement of the narrow ribbons 39a from their original chevron-like pattern in the blank by a parallel swinging motion, so to speak, with the chevron angle increasing as the ribbons approach their final position in the shear plate. During such swinging movement of the chevron pattern of ribbons 39a, the metal of the ribbons is shaped to arcuate form so that as the ribbons approach their final position they become arcuate in cross section, such shaping of the ribbons being accomplished by the design of the dies which operate upon the blank and which will now be described in detail.

The linear extent of the ribbons of metal between adjacent pairs of slots must exceed the arcuate extent of the torus. Otherwise, upon downward swinging movement of the chevron pattern as described above, there would be insufficient metal in the ribbons to permit them to move into the outline of the torus without involving deep drawing or stretching of the metal. If the effective linear extent of each pair of ribbons is exactly equal to the arcuate extent of the torus, then the ribbons may be swung through an angle of 90° and the inclined slots in the blank will move into 180° coincidence with the completed torus. However, for a more effective shearing action, it is desired that the slots in the completed torus shall be inclined relative to the path of movement of the cutting edge of the moving cutter element and thus, it is necessary that the combined extent of each pair of ribbons be greater than the arcuate extent of the torus. When such a relationship is maintained, continued circumferential shifting and axial displacement of the band 38a will cause the ribbons 39a to lie within the cylindrical outline of the torus and assume the form of an arc of an ellipse.

Since the ends of the ribbons are anchored at points which are spaced apart by a distance equal to the radial width of the torus the effective combined length of the ribbons is a direct function of the angle of inclination between adjacent paired ribbons. If this angle (measured in degrees) is maintained less than twice the arcuate extent of the torus (also measured in degrees), then the ribbons may be brought into the cylindrical confines of the torus in the form of an ellipse. If such an angle is greater than twice the arcuate extent of the torus, then the forming dies are incapable of swinging the ribbons into the cylindrical confines of the torus without stretching the metal of the ribbons.

Referring now to FIGS. 1 to 3 inclusive, the die instrumentalities by means of which the blank 50 is shaped to final form involve in their general organization a set of upper dies 100 and a cooperating set of lower dies 102, both sets of dies being fixedly mounted on a standard 104 which, in turn, may be mounted on a suitable bench or table 106.

The upper die set 100 includes an outer sleeve or holder 108, one side of which is flattened as at 110 for attachment to the forward face of the standard 104 by means of screws 112. Fixedly secured within the holder 108 by means of the screws 112 is a cylindrical outer clamping die 114 having a flat annular clamping surface 116. Movably mounted within the outer clamping die 114 for both limited rotational and vertical shifting movements is an intermediate cylindrical forming and clamping die 118 having a lower annular clamping surface 120 which is shaped conformably to the concave side of the torus to be formed in the blank 50. Fixedly secured within the cylindrical die 118 is an inner clamping die 122 having a lower flat annular clamping surface 124. The die 122 is maintained in its fixed position by means of a circular top plate 126 which extends across the upper ends of the various dies and which is secured by screws 128 to the holder 108 and to which the upper end of the central clamping die 122 is secured by means of a screw 130.

Rotational and vertical shifting movements are applied to the intermediate die 118 by means of an actuating rod 132 which is provided with a stop collar 134 which seats against one side of the die 118 when the threaded inner end 136 of the rod is threadedly received in the die. The actuating rod 132 projects outwardly through the die 114 and holder 108 which are slotted as at 140 and 142 respectively for this purpose.

The lower die set 102 includes an outer sleeve or holder 150 similar to the holder 108 and similarly applied to the standard 104. Within the holder 150 there is mounted for vertical sliding movement a concentric three-part die assembly designated in its entirety at 152. The die assembly 152 includes an outer clamping and forming die 154, an intermediate clamping die 156, and an inner clamping and forming die 158, the latter being capable of limited rotational and vertical shifting movements relative to the two other sides. The inner die 158 is maintained centered within the assembly by means of an end closure member 160 which is secured by screws 162 to the outer die 154, and to which closure member the inner die 158 is secured by means of a bearing screw 163. The dies 154 and 158 are provided with upper annular clamping surfaces 164 and 166 (FIG. 4) designed for clamping cooperation with the clamping surfaces 116 and 124 respectively. The dies 154 and 158 are further provided with annular recessed surfaces 168 and 170 which, considered collectively, are shaped conformably to the shape of the lower forming surface 120 and consequently to the shape of the convex side of the torus to be formed. The intermediate clamping die 156 is provided with a narrow upper clamping edge 171.

The intermediate die 156 is movable vertically with respect to the dies 154 and 158 between the lowered position wherein it is shown in FIGS. 1 and 5, and the raised position wherein it is shown in FIG. 6. The die 156 is normally and yieldingly maintained in its raised position within the assembly 152 by means of a spring 173 which seats at its lower end on the closure member 160 and which bears at its upper end against a platform 172 which supports a series of anti-friction balls 174 which, in turn, support the die 156. Rotational and vertical shifting movements are applied to the intermediate die 158 by means of an actuating rod 176 which is secured to the die in a manner similar to the attachment of the rod 132 to the die 118. The rod projects outwardly through slots 178 and 180 provided in the die 154 and holder 150 respectively.

The entire lower die assembly 152 is movable bodily between a lowered position wherein the die surfaces thereon are out of cooperation with the die surfaces on the upper die instrumentalities, and a raised position wherein these various opposed die surfaces are in cooperating register. Accordingly, the standard 104 is formed with a forwardly extending foot 182 (FIG. 1) to which there is pivoted a pressure-applying cam 184 having an operating handle 186. The upper end of the cam 184 is adapted to bear against the head of the bearing screw 162 for die raising and lowering purposes.

Still referring to FIGS. 1 to 3 inclusive, means are provided whereby the two actuating rods 132 and 176 may operate in the manner of crank arms to impart both rotational and vertical shifting movement to the dies 122 and 158 to which they are respectively attached. Accordingly, the holder 108 has affixed thereto by means of clamping screws 181, a curved plate 183 which is formed with a diagonal guide slot 185 therein and through which slot the rod 132 projects. A spring 179 biases the rod to its retracted position. The inclination of the slot 185 is such that upon application of force to the outer end of the rod 132 in a direction tending to rotate the die 122 in one direction, the rod 132 will be guided downwardly in the slot and the die 122 will accordingly be moved downwardly and at the same time rotated through a limited degree of turning movement. The holder 174 similarly has affixed thereto a curved slotted plate 187 which is similar in function to the plate 183 and which is provided with an inclined slot 188, the lower end of which has a vertical offset 190. The rod 176 passes through the slot 188 and when it is disposed in the vertical offset 190 the intermediate clamping die 156 assumes the lowermost position of which it is capable of assuming with the upper edge 171 thereof below the level of the clamping surfaces 164 and 166 on the adjacent dies 114 and 118 respectively.

Means are provided whereby the two actuating rods 132 and 176 may be operated in unison to equalize the coaxial and simultaneous descent of the upper and lower movable dies 118 and 156 respectively and to apply thereto equal increments of rotary motion during such descent. Accordingly, the plates 183 and 187 have slidably mounted thereon a vertically reciprocable cam plate 189 which is provided with upper and lower inclined cam surfaces 191 and 193 respectively designed for engagement with the outer end regions of the actuating rods 132 and 176. As viewed in FIG. 2, it will be seen that upon downward movement of the cam plate 189 the inclined cam surfaces 191 and 193 will act upon the rods 132 and 176 to force the same in unison in a clockwise direction. The rods, thus impelled by the cam plate 189, will be guided in the respective slots 185 and 188 and the dies 118 and 156 associated therewith move accordingly.

The cam plate 189 may be provided with a counterbalancing spring 195 and actuation of the block may be effected under the control of a manually operable bell crank lever 197 which is pivoted to the plate 183 as at 199. The lever 197 has a foot portion 201 engageable with the upper edge of the plate 189.

In operation of the die instrumentalities 100, 102, the circular blank 50 is positioned between the upper and lower die set as shown in FIGS. 1 and 5 and is centered in position on the lower die set 102 by means of a pilot lug 203 which projects upwardly from the die 158 and through the square pilot hole 23 provided in the blank 50. Thereafter, the operating handle 186 is manipulated to raise the die assembly 152 and cause the pilot lug 203 to enter a pilot socket 205 provided in the lower end of the die 122. When the cam 184 is tightened against the backing screw 163, the two clamping surfaces and 116 and 164 engage the outer margin 24 of the blank 50 therebetween, while the two clamping surfaces 124 and 166 engage the inner hub portion 22 of the blank therebetween. The upper clamping edge 171 of the intermediate die 156 is caused to bear against the imperforate annulus under the influence of the spring 173.

With the parts thus in position against the blank, the two actuating rods 132 and 176 are actuated under the control of the lever 197 and the rods are moved or swung in unison in a clockwise direction as seen in FIG. 3. During such movement of the rods, the two dies 118 and 156, while maintaining their frictional grip on the imperforate circular region 38 of the blank 50, are caused to rotate about the vertical axis of the die assembly and, at the same time, to descend so that the forming surfaces 120 of the upper die 118 approaches the forming surfaces 168 and 170 of the two lower dies 154 and 158 respectively. The annular imperforate circular region 38 of the blank is thus shifted circumferentially and at the same time lowered out of the plane of the firmly clamped medial and marginal portions of the blank. The ribbons 39a are collectively swung downwardly as previously described according to the method involved in shaping the blank and are caused to become wrapped, so to speak, around the lower curved end 120 of the die 118 until such time as the dies 118 and 156 become seated, whereupon the ribbons 39a are shaped between the various die surfaces 120, 168 and 170 so that they will lie entirely within the curvature of the torus 26 of the finished shear plate 20.

It is to be noted at this point that in thus displacing the chevron-like pattern of ribbons 39a there will be no molecular displacement of metal except at the regions of juncture of these ribbons with the inner hub portion 22a and the outer marginal rim portion 24a of the blank. At these regions of juncture there may be a slight twisting of the metal as the ribbons swing downwardly about their pivotal axes of swinging movement. The molecular structure of the main body of the ribbons 39a remain undisturbed. Any displacement of metal at the regions of juncture between the ribbons and the adjacent fixed regions of the blank will be flattened out, so to speak, by the cooperating die surfaces 120, 168 and 170 so that all portions of the completed torus 26 will be truly cylindrical and so that the metal of the torus will be of uniform thickness throughout.

The final movement of the lower actuating rod 176 into the vertical offset 190 of the slot 188 will effect on abrupt lowering of the die 156 so that the upper clamping edge thereof is released from its clamping engagement with the imperforate annular region or band 38a of the blank 50 and is withdrawn below the level of the forming surfaces 168 and 170 of the dies 154 and 158 respectively. The completely formed shear plate 20 may then be removed from the die instrumentalities.

As a final consideration, it is to be noted that for the various parts of ribbons 39a effectively to seat upon the lower convex die surfaces 168 and 170 at the termination of their swinging movement, the combined effective length of each pair of ribbons must be at least as great as the cross sectional arcuate extent of the torus undergoing formation. When the ribbons are equal in extent to the arcuate extent of the torus, their initial angular relationship in the blank 50 will be progressively increased as they swing downwardly until such time as they contact the lower dies 154 and 158, at which time they will have swung throughout an angle of 90° so that the various pairs of slots 36 will become aligned in end-to-end fashion and their stereographic projection will be truly radial. However, it is desirable for an effective cutting action that the cutting edge 36 of the cutter 28 encounters the edges of the slots at an angle and thus, in the illustrated form of the blank, the combined length of each pair of ribbons 39a is considerably greater than the arcuate extent of the torus whose outline they are to assume. By such an arrangement, the ribbons will move into contact with the lower dies 154 and 158 after they have been swung through an angle considerably less than 90°, for example 45°. The ribbons will then assume an elliptical pattern as viewed on the surface of the torus and the intervening slots 36 will be inclined relative to each other at a more obtuse angle than their angle of inclination in the flat blank. In the exemplary form of blank shown herein, the slots 36a are inclined at an angle of approximately 135° relative to each other. In the completed torus, the slots 36 assume a more obtuse angular relationship which, in the blank selected for illustration, amounts to approximately 157½°.

Since the remote ends of each pair of ribbons are fixedly attached to the adjacent clamped regions of the blank in the dies, the angular disposition of the paired ribbons is a function of their length. If the symbol C designates the arcuate extent in degrees of inclination between the paired slots, the expression $C=2(180-\theta)$ denotes a relationship where the paired ribbons may be swung downwardly through an angle of 90° to bring the two ribbons into axial alignment in the completed torus without stretching of the metal of the ribbons. It follows therefore that if C is made less than $2(180-\phi\ \theta)$ an elliptical disposition of the ribbons will result wherein the intervening slots are inclined relative to each other in the completed torus so that the cutting edge of the cutter will effect a scissors-like shearing action on the longitudinal sides of the slots.

While one specific and preferred form of the apparatus by means of which the present method of forming shear plates from flat circular blanks may be carried out has been been illustrated and described herein, it will be understood that this form of apparatus does not by any means indicate the only form suitable for the process. The form illustrated herein is merely one which has been developed for commercial application of the process. The invention therefore is not to be limited to the exact arrangement of parts shown in the accompanying drawings or described in this specification as various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. The method of producing from a thin flat imperforate circular blank, a shear plate having an offset lateral concavo-convex torus extending therearound and perforated to provide two rows of circumferentially spaced elongated shear perforations, one on each side of the torus crest, said method comprising forming in said blank two concentric circular rows of spaced parallel elongated slots with an intervening annulus therebetween, said slots being arranged in pairs, one on each side of the annulus with the axes of each pair of slots being inclined relatively to each other, and thereafter shifting said annulus bodily relatively to the portions of the blank existing radially outwardly and radially inwardly of the rows of slots circumferentially about the central axis of the blank while simultaneously forcing the same axially in one direction out of the plane of the blank and into coincidence with the crest portion of the torus outline, while at the same time, and as a result of such shifting and forcing, applying deforming pressure to the material of the blank immediately surrounding the rows of slots so as to bring the same into coincidence with the remainder of the torus outline, to thus establish the torus and shear perforations therein.

2. The method of producing from a thin flat imperforate circular blank, a shear plate having an offset lateral concavo-convex torus extending therearound and perforated to provide two rows of circumferentially spaced elongated shear perforations, one on each side of the torus crest, said method comprising forming in said blank two concentric circular rows of spaced parallel elongated slots with an intervening annulus therebetween, said slots being arranged in pairs, one on each side of the annulus with the axes of each pair of slots being inclined relatively to each other at an angle sufficiently acute that the combined axial extent of the paired slots from the point of axis intersection to the remote ends of the slots is greater than the transverse arcuate extent of the torus, and thereafter shifting said annulus bodily relatively to the portions of the blank existing radially outwardly and radially inwardly of the rows of slots circumferentially about the central axis of the blank while simultaneously forcing the same axially in one direction out of the plane of the blank and into coincidence with the crest portion of the torus outline, while at the same time, and as a result of such shifting and forcing, applying deforming pressure to the material of the blank immediately surrounding the rows of slots so as to bring the same into coincidence with the remainder of the torus outline, to thus establish the torus and shear perforations therein.

3. The method of producing from a thin flat imperforate circular blank, a shear plate having an offset lateral concavo-convex torus extending therearound and perforated to provide two rows of circumferentially spaced elongated shear perforations, one on each side of the torus crest, said method comprising forming in said blank two concentric circular rows of spaced parallel elongated slots with an intervening annulus therebetween, said slots being arranged in pairs, one on each side of the annulus with the axes of each pair of slots being inclined relatively to each other, fixedly clamping the marginal and central hub regions of the flat blank between respective fixed clamping dies, clamping said annulus between movable clamping dies, and thereafter rotating the movable clamping dies relatively to the fixed clamping dies while at the same time shifting the movable clamping dies axially of the fixed clamping dies in one direction to such an extent that the annulus is moved into coincidence with the crest portion of the torus outline and, during the shifting operation, applying opposed shaping dies to the material of the blank in the vicinity of the rows of slots and causing such material to move into coincidence with the remainder of the torus outline.

4. The method of producing from a thin flat imperforate circular blank, a shear plate having an offset lateral concavo-convex torus extending therearound and perforated to provide two rows of circumferentially spaced elongated shear perforations, one on each side of the torus crest, said method comprising forming in said blank two concentric circular rows of spaced parallel elongated slots with an intervening annulus therebetween, said slots being arranged in pairs, one on each side of the annulus with the axes of each pair of slots being inclined relatively to each other, at an angle sufficiently acute that the combined axial extent of the paired slots from the point of axis intersection to the remote ends of the slots is greater than the transverse arcuate extent of the torus, fixedly clamping the marginal and central hub regions of the flat blank between respective fixed clamping dies, clamping said annulus between movable clamping dies, and thereafter rotating the movable clamping dies relatively to the fixed clamping dies while at the same time shifting the movable clamping dies axially of the fixed clamping dies in one direction to such an extent that the annulus is moved into coincidence with the crest portion of the torus outline and, during the shifting operation, applying opposed shaping dies to the material of the blank in the vicinity of the rows of slots and causing such material to move into coincidence with the remainder of the torus outline.

5. The method of producing from a thin flat imperforate circular blank, a shear plate having an offset lateral concavo-convex torus extending therearound and perforated to provide two rows of circumferentially spaced elongated shear perforations, one on each side of the torus crest, said method comprising forming in said blank two concentric circular rows of spaced parallel elongated slots with an intervening annulus therebetween, said slots being arranged in pairs, one on each side of the annulus with the axes of each pair of slots being inclined relatively to each other thus providing in the intervening regions of the blank a circular series of ribbons which are arranged in a chevron-like pattern circumferentially around the blank, fixedly clamping the marginal and central hub regions of the flat blank between respective fixed clamping dies, clamping said annulus between movable clamping dies, and thereafter rotating the movable clamping dies relatively to the fixed clamping dies while at the same time shifting the movable clamping dies axially of the fixed clamping dies in one direction to such an extent that the annulus is moved into coincidence with the torus outline while at the same time the ribbons are swung bodily about respective axes coincident with the plane of the blank and passing through the remote ends of the ribbons and, during the shifting operation, applying opposed shaping dies to the material of the ribbons to force the ribbons into the torus outline.

6. Die instrumentalities for producing in a flat circular blank a circumferential shift and lateral displacement of a medial annular region of the blank, said die instrumentalities comprising upper and lower die sets respectively movable toward and away from each other into and out of blank-engaging relationship, each die set comprising concentric nested cylindrical dies including inner and outer relatively fixed spaced apart dies, and an intermediate relatively movable die capable of both limited circumferential and axial shifting movement within the annulus between the inner and outer dies, the inner, outer and intermediate dies of the two sets being disposed in axial alignment respectively and having opposed rims presenting opposed annular clamping surfaces between which the inner central portion of the blank, the outer marginal portion of the blank, and the intermediate annular portion of the blank are adapted to be respectively clamped when the die sets are in blank-engaging relationship, the clamping surface on the lower intermediate clamping die being narrower than the radial thickness of opposed rim of the upper intermediate clamping die and being engageable with the central region of the latter rim, and means operable when said die sets are in blank-engaging relationship for imparting limited rotational and axial shifting movement in one direction to said intermediate dies bodily as a unit while maintaining the same in their blank-engaging relationship, the remainder of the rim of said upper intermediate die being engageable with portions of the rims of the lower inner and outer fixed dies for effecting blank-shaping operations after said intermediate dies have been rotatably and axially shifted.

References Cited in the file of this patent

UNITED STATES PATENTS

| 650,926 | Creager | June 5, 1900 |
| 1,551,832 | Miller et al. | Sept. 1, 1925 |
| 1,699,693 | Eisenhauer | Jan. 22, 1929 |
| 2,880,686 | Higgin | Apr. 7, 1959 |

FOREIGN PATENTS

| 807,148 | Great Britain | Jan. 7, 1959 |